Mar. 27, 1923.
W. E. McLAREN
COLLAPSIBLE VEHICLE
Filed Oct. 20, 1921
1,449,827
2 sheets-sheet 1
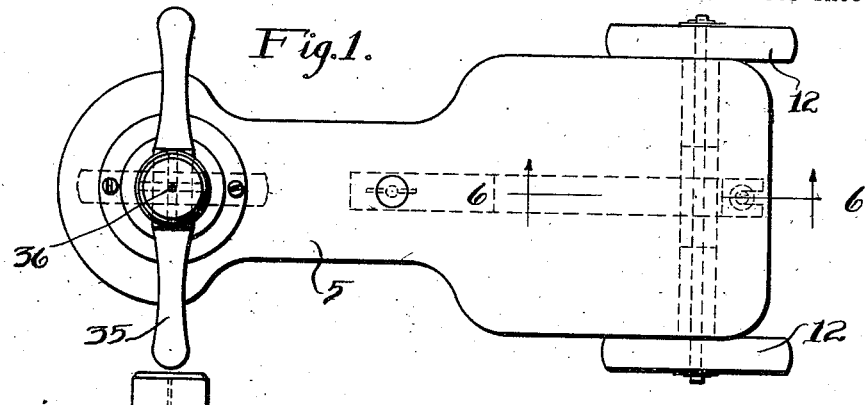
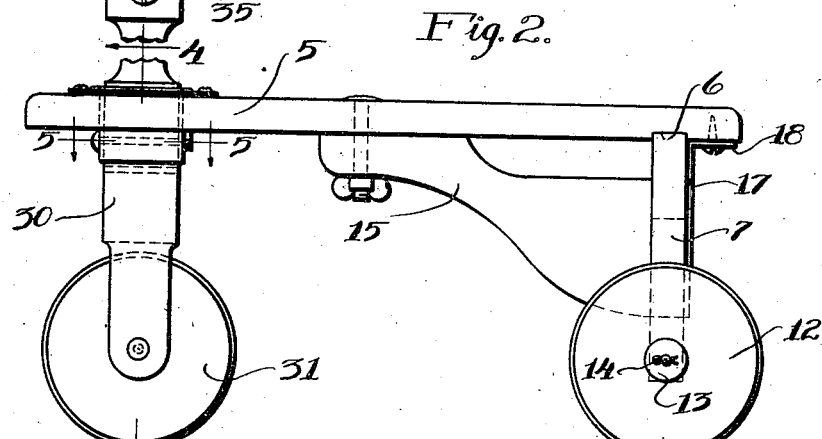
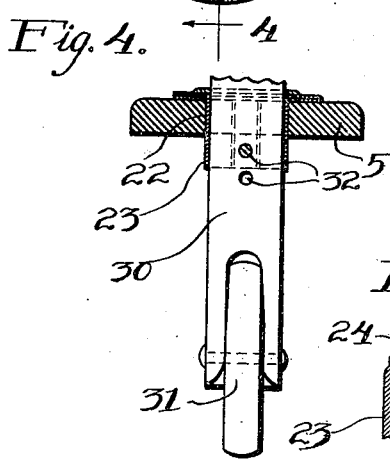
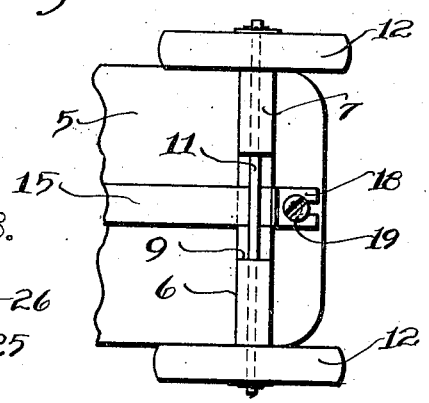
Witnesses
Geo. L. Lawrence
Inventor
William E. McLaren
By Chas. A. Tillman
Atty.

Mar. 27, 1923.
W. E. McLAREN
COLLAPSIBLE VEHICLE
Filed Oct. 20, 1921
1,449,827
2 sheets-sheet 2
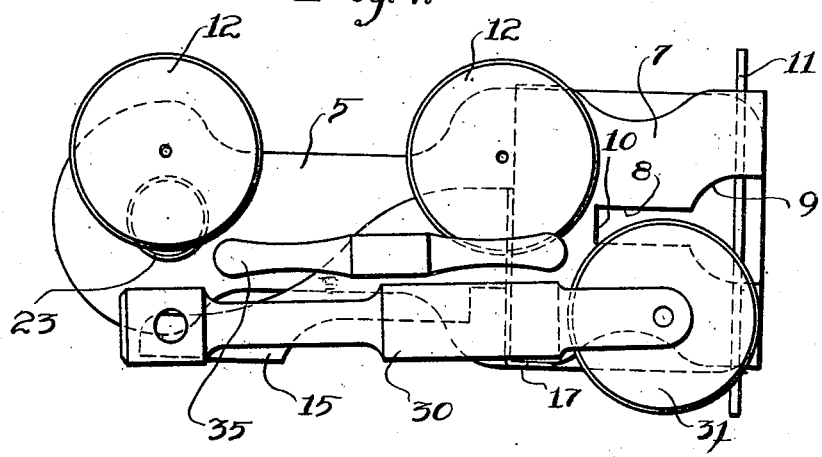
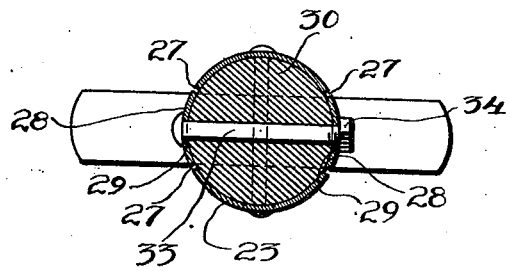
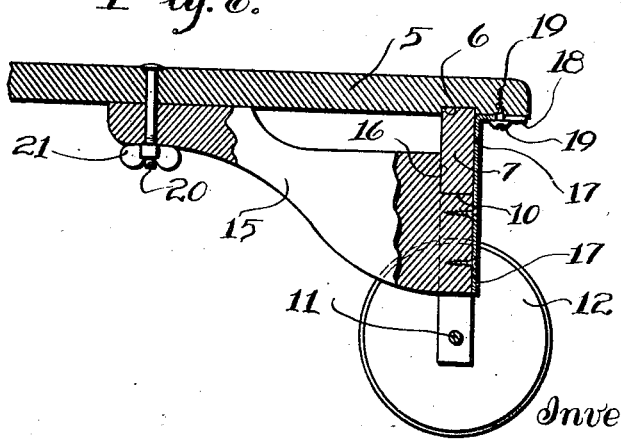
Witnesses
Geo L Lawrence
Inventor
William E. McLaren
By Chas. C. Tillman
Atty.

Patented Mar. 27, 1923.

1,449,827

UNITED STATES PATENT OFFICE.

WILLIAM E. McLAREN, OF PASADENA, CALIFORNIA, ASSIGNOR OF ONE-HALF TO JAMES W. SLEIGHT, OF CHICAGO, ILLINOIS.

COLLAPSIBLE VEHICLE.

Application filed October 20, 1921. Serial No. 509,142.

*To all whom it may concern:*

Be it known that I, WILLIAM E. MCLAREN, a citizen of the United States, residing at Pasadena, county of Los Angeles, and State of California, have invented certain new and useful Improvements in a Collapsible Vehicle, of which the following is a specification.

This invention relates to new and useful improvements in wheeled vehicles of the collapsible or knockdown type.

One of the objects of the invention is to provide such a vehicle with a rear bolster and a brace therefor, which can be set up or knocked down readily, and which, when in the latter condition, may be disposed in compact relation and thereby occupy but little space.

Another object of the invention is to provide a vehicle of the character described in which the bolster and brace have detachably interlocking connections with one another and with the seat-board of the vehicle.

A further object of the invention is to provide a steering post for the vehicle which is provided with a bearing sleeve of such construction as will avoid the necessity of having equal the diameter of the post and the inside diameter of the sleeve, and yet insure such a connection between the two as to prevent relative movements thereof.

A still further object of the invention is to provide a novel detachable, and vertically adjustable connection between the post and the sleeve which supports the front end of the seat-board, whereby the plane of said seat-board may be readily adjusted.

In the drawings,

Figure 1 is a plan view of a vehicle constructed in accordance with my invention, Figure 2 is a side elevation thereof, Figure 3 is a detail bottom plan view of the rear end portion thereof, Figure 4 is a detail sectional view taken on the line 4—4 of Figure 2, Figure 5 is a detail sectional view taken on the line 5—5 of Figure 2, Figure 6 is a detail sectional view taken on the line 6—6 of Figure 1, Figure 7 is a plan view showing the vehicle in its collapsed or knock-down condition, and Figure 8 is a detail sectional view of a part of the bearing for the steering post.

Like reference numerals designate corresponding parts in all the figures of the drawings.

Referring to the drawings, 5 designates a seat-board which is provided in its under face and adjacent the rear end thereof with a transverse groove or seat 6, which is adapted to detachably receive the upper end of a bolster 7. This groove connection forms a detachable interlocking connection between the bolster and the seat-board and serves to retain the bolster against backward and forward movements. This bolster is formed with a centrally disposed opening, the upper end of which forms an angular seat 8, and the lower end thereof forms an enlarged opening 9 which communicates with said seat. The extreme upper end of the opening is closed by a wall 10, which forms a part of the seat 8. Carried by the bolster 7, and extending across the enlarged portion 9 of the opening is an axle 11, on which is detachably journaled the rear supporting wheels 12—12, each supporting wheel being held in place by a washer 13 and cotter pin 14.

Co-operating with the seat-board 5 and bolster 7 is a brace 15. This brace is provided with a notched portion 16, which is located in the upper corner of the rear end thereof, and forms a seat which co-operates with the wall 10 of the seat 8 of the bolster and with the inner face of said bolster, as clearly shown in Figure 6. Secured to the extreme rear end of the brace 15 is a metallic arm 17, which extends upwardly beyond the seat 8, and terminates in a rearwardly extending fork 18, the latter straddling the shank of a headed screw 19, which is secured to the under side of the seat-board. It will thus be seen that the brace and bolster have an interlocking connection with one another and with the seat-board. A detachable bolt 20 passes through aligned openings respectively formed in the seat-board and in the front end of the brace, and a winged nut 21 co-operates with the bolt to retain the bolster and brace in their interlocked relation. It will be noted that the bolt 20 and nut 21 constitute a releasable means.

When it is desired to collapse this portion of the vehicle, the bolt 20 is first removed. The front end of the brace 15 is then swung downwardly and moved forwardly, thus releasing the upper end of the bolster from the groove 6 of the seat-board, and at the same time withdrawing the fork 18 from its interlocking engagement with the screw 19. The enlarged opening 9 in the bolster is of sufficient size to readily permit the brace being dropped downwardly and swung upwardly so as to withdraw the metallic arm 17 through said opening 9. When it is desired to assemble these parts, the operation above noted is reversed, that is, the arm 17 is inserted within the opening of the bolster and the fork 18 thereof is engaged with the screw 19. The front end of the brace is then swung upwardly so as to dispose the upper end of the bolster in the seat 6 of the brace, and finally the bolt 20 is inserted to secure the parts above noted in their interlocking relation.

Formed in the front end of the seat-board is an opening 22, in which is mounted a metallic bearing sleeve 23, having at its upper end an outwardly extending flange 24, which is adapted to rest, and have sliding engagement, upon a ring 25 secured to the upper face of the seat-board. Disposed above the ring 25 and suitably secured to the seat-board is a bearing ring 26, having its inner portion extending over the flange 24. As a result of this construction, the flange 24 is disposed between the rings 25 and 26, which are fixed to the seat-board. Thus, the sleeve 23 cannot have vertical movements relative to the seat-board, but may have turning movements only. The lower end of the sleeve 23 is formed with a plurality of upwardly extending slots 27, which form diametrically opposed tongues 28—28, each tongue being formed with an opening 29. Located within the sleeve 23 is a steering post 30, which carries at its lower end a front supporting wheel 31. The post 30 is formed with a plurality of vertically spaced transverse openings 32. A clamping bolt 33 is adapted to be passed through the openings 29 of the sleeve and through either of the transverse openings 32 of the post. A nut 34 is associated with the bolt and serves to draw the tongues 28—28 inwardly so as to engage the post and thereby clamp the sleeve and post against relative movements. It will be seen that by means of the tongues 28—28 it will be unnecessary for the diameter of the post to be as great as the interior diameter of the sleeve, as the tongues 28—28 will yield under the clamping action of the bolt.

Extending through a transverse opening formed in the upper end of the post 30 is a handle 35. This handle is detachably secured to the post by means of a pin or screw 36. When it is desired to collapse or knock down this portion of the vehicle, the handle 35 is first withdrawn from the post 30. The bolt 33 is then withdrawn. This permits the post to be withdrawn from the sleeve 23 which remains attached to the seat-board.

When it is desired to adjust the horizontal plane of the seat-board so as to accommodate the same to children of different heights, it is only necessary to withdraw the bolt 33 and insert the same in the desired opening 32, passing said bolt through the sleeve and then clamping the sleeve to the post.

When it is desired to ship the vehicle, the same can be readily collapsed or knocked down and the parts positioned as shown in Figure 7. In these positions the parts are in a very compact relation and occupy but very little space, thus permitting the same to be readily packed in a carton of relatively small cubic capacity.

What I claim is:

1. In a knock-down vehicle, the combination with a seat-board, of a bolster having detachable interlocking engagement therewith, a brace disposed longitudinally of the seat-board and extending through and having interlocking engagement with said bolster, an upwardly extending arm fixed to the rear end of said brace and terminating in a laterally extending fork, said seat-board being provided with means having detachable interlocking connection with said fork, and means for detachably connecting the front end of said brace with said seat-board.

2. In a wheeled vehicle, the combination with a seat-board having an opening in the front end thereof, of a steering post journaled in said opening, a metallic bearing sleeve surrounding the post and disposed within the opening of said seat-board, said sleeve being provided with means for supporting said seat-board, said sleeve being slotted longitudinally to form a tongue, and a clamping bolt extending through the post and the tongue of said sleeve for clamping said post and sleeve against relative movements.

3. In a wheeled vehicle, the combination with a seat-board having an opening in the front end thereof, of a steering post journaled in said opening, a metallic bearing sleeve surrounding the post and disposed within the opening of said seat-board, said sleeve being provided with means for supporting said seat-board, said sleeve being slotted longitudinally to form diametrically opposed tongues, and a clamping bolt extending through said post and tongues for clamping said tongues against the post to prevent relative movements between the post and the sleeve.

4. In a wheeled vehicle, the combination with a seat board having an opening near the front end thereof, of supporting wheels connected to the rear end of said seat board, a steering post journaled in said opening, said post being formed with spaced transverse and parallel openings located one above the other, a wheel journaled on said post, a bearing sleeve surrounding the post and disposed within the opening of said seat board, said sleeve being provided at its upper end with means for supporting said seat board, said sleeve being slotted longitudinally to form a tongue, said tongue and sleeve being formed with diametrically opposed openings adapted to register with either of the transverse openings of the post, and a clamping bolt adapted to be seated in either of said transverse openings in the post and in the openings in the sleeve and tongue, whereby the sleeve and post may be clamped together and the seat board secured in an adjusted position.

WILLIAM E. McLAREN.